RUDOLPH SEIFFERT.
Improvement in Horse Shoes.
No. 119,415.          Patented Sep. 26, 1871.
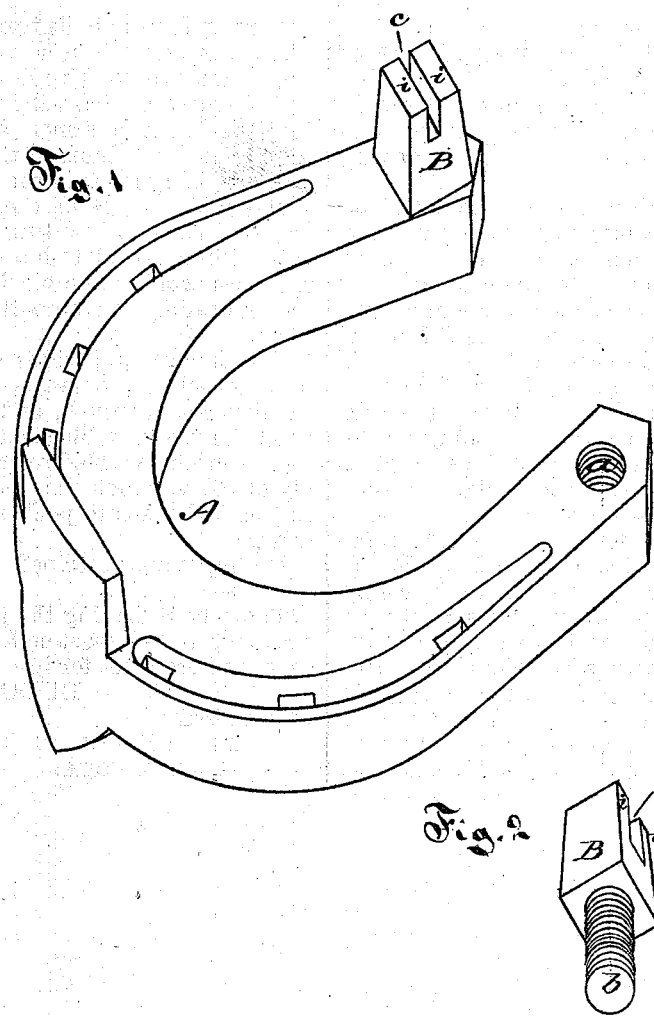

UNITED STATES PATENT OFFICE

RUDOLPH SEIFFERT, OF CHICAGO, ILLINOIS.

IMPROVEMENT IN HORSESHOES.

Specification forming part of Letters Patent No. 119,415, dated September 26, 1871.

*To all whom it may concern:*

Be it known that I, RUDOLPH SEIFFERT, of Chicago, in the county of Cook and State of Illinois, have invented certain Improvements in Horseshoes, of which the following is a specification, reference being had to the accompanying drawing.

My invention relates to a horseshoe, provided with removable heel-calks, which have their lower ends divided by one or more slots into teeth so as to take a firm hold upon the ground.

Figure 1 is a perspective view of my improved shoe with one calk detached, and Fig. 2 is a perspective view of the detached calk.

In constructing my improved shoe I form its body in the usual manner, with the toe-calk welded thereon; but, instead of welding on the heel-calks, I leave the two ends of the shoe plain and flat, and through each end make a vertical hole, *a*, provided with a screw-thread. The calks B I make of a square form, and provide them each with a threaded stem or neck, *b*, on the upper end, so that they may be secured to the shoe by screwing said necks into the holes *a*. In the lower ends of the calks I make one or more slots, *c*, thus dividing the lower end of the calk into two or more teeth or prongs, *i i*, and causing it to take a firm hold on the ground. The slots may all be parallel, or they may be made across each other. In the former case they should, of course, be arranged so as to lie transversely to the shoe. The calks being thus attached by screw-stems can be removed and replaced by others at will, and, being provided with the slots or grooves, they take a much firmer and better hold upon the ground than those of the ordinary form. By forming the grooves in the calks the necessity of a wrench for detaching them is avoided, as they may be turned by inserting a screw-driver or any other thin metal plate into the slots. This feature is especially valuable for travelers and others who cannot conveniently carry a wrench with them.

This invention, besides saving great expense to all owners of horses, is especially valuable to cavalrymen, travelers, and others who are beyond the reach of blacksmiths, but who are, by my invention, enabled to carry with them a supply of calks, which may be quickly applied by the use of a small pocket-wrench or a screw-driver.

Having thus described my invention, what I claim is—

The calk B, having the groove *c* formed in its end, with the screw-stem *b* for securing it to the shoe, as herein set forth.

RUDOLPH SEIFFERT.

Witnesses:
FRITZ FOLTZ,
GEORGE POHL. (45)